(12) United States Patent
Yen

(10) Patent No.: US 6,611,114 B1
(45) Date of Patent: Aug. 26, 2003

(54) CONTROL CIRCUIT ASSEMBLY FOR FOUNTAIN DISPLAY APPARATUS

(76) Inventor: Jen-Yen Yen, No. 22-1, Lane 3, Haochin Rd., Nanhsin Tsun, Yenpu Hsiang (TW)

( * ) Notice: Subject to any disclaimer, the term of this patent is extended or adjusted under 35 U.S.C. 154(b) by 0 days.

(21) Appl. No.: 10/144,715

(22) Filed: May 15, 2002

(51) Int. Cl.[7] .............................. H05B 37/02; F21S 8/00; H01L 27/14
(52) U.S. Cl. .................. 315/360; 315/292; 315/316; 315/129; 315/149; 239/18; 239/16; 239/DIG. 1; 239/DIG. 15; 362/800; 362/806
(58) Field of Search ................................ 315/360, 316, 315/292, 291, 129, 134, 149; 239/18, 19, 20, 16, 17, 23, DIG. 1, DIG. 15; 362/800, 806

(56) References Cited

U.S. PATENT DOCUMENTS

| | | | | | |
|---|---|---|---|---|---|
| 4,305,117 A | * | 12/1981 | Evans | .......................... | 362/96 |
| 4,317,071 A | * | 2/1982 | Murad | ........................ | 315/312 |
| 5,152,210 A | * | 10/1992 | Chen | ........................ | 84/464 R |
| 6,206,298 B1 | * | 3/2001 | Ting | ............................ | 239/20 |
| 6,276,612 B1 | * | 8/2001 | Hall | .............................. | 239/17 |

* cited by examiner

Primary Examiner—Don Wong
Assistant Examiner—Tuyet T. Vo
(74) Attorney, Agent, or Firm—Rosenberg, Klein & Lee

(57) ABSTRACT

A control circuit assembly installed in a fountain display apparatus for controlling the reproduction of music and the formation of artificial springs and a lighting effect subject to the reproduction of music.

1 Claim, 3 Drawing Sheets

CONTROL CIRCUIT ASSEMBLY FOR FOUNTAIN DISPLAY APPARATUS

BACKGROUND OF THE INVENTION

1. Field of the Invention

The present invention relates to a fountain display apparatus and, more specifically, to a control circuit assembly for use in a fountain display apparatus to control the performance of "water dance".

2. Description of the Related Art

Conventional fountain display apparatus are not programmable, i.e., conventional fountain display apparatus simply drive motor pumps to pump water upwardly out of jet nozzles to produce artificial springs when electrically connected. The monotonous artificial spring pattern is less attractive.

SUMMARY OF THE INVENTION

The present invention has been accomplished under the circumstances in view. It is one object of the present invention to provide a control circuit assembly for fountain display apparatus, which produces sound and lighting effects when making artificial springs. It is another object of the present invention to provide a control circuit assembly for fountain display apparatus, which is practical for use with a portable fountain display apparatus. It is still another object of the present invention to provide a control circuit assembly for fountain display apparatus, which changes the pattern of the artificial springs and the lighting mode subject to the performance of the reproduction of music. It is still another object of the present invention to provide a control circuit assembly for fountain display apparatus, which enables the user to select music from the built-in sound source or an external sound source. It is still another object of the present invention to provide a control circuit assembly for fountain display apparatus, which enables the user to set the control mode for controlling the pattern of the artificial spring and the lighting mode subject to the music selected. To achieve these and other objects, the control circuit assembly comprises a built-in sound source circuit and an external sound source circuit adapted for providing a sound source, a low-frequency amplification and output circuit for output of low frequency signal subject to the presence of sound signal from the built-in sound source circuit or the external sound source circuit, an audio amplification and output circuit for output of sound, a LED driver controlled by the low-frequency amplification and output circuit to turned on/off LEDs, a motor driver controlled by the low-frequency amplification and output circuit to turn on/off motor pumps, and a programmable timer circuit for controlling the LED driver and the motor driver to turn on/off the LEDs and the motor pumps subject to a predetermined setting.

DETAILED DESCRIPTION OF THE PREFERRED EMBODIMENT

Figure 1:
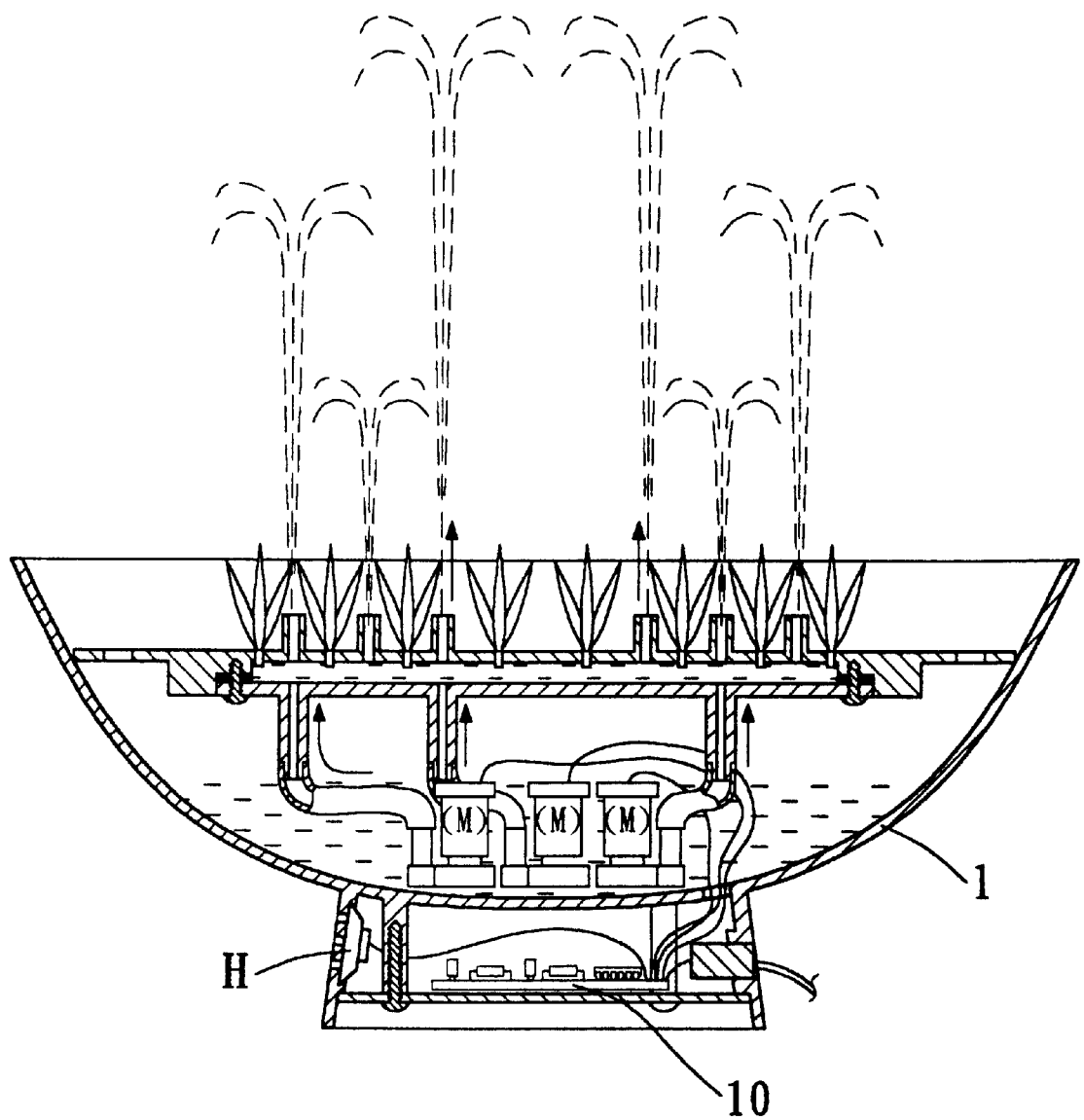
FIG. 1 is a sectional view of a fountain display apparatus constructed according to the present invention.
Figure 2:
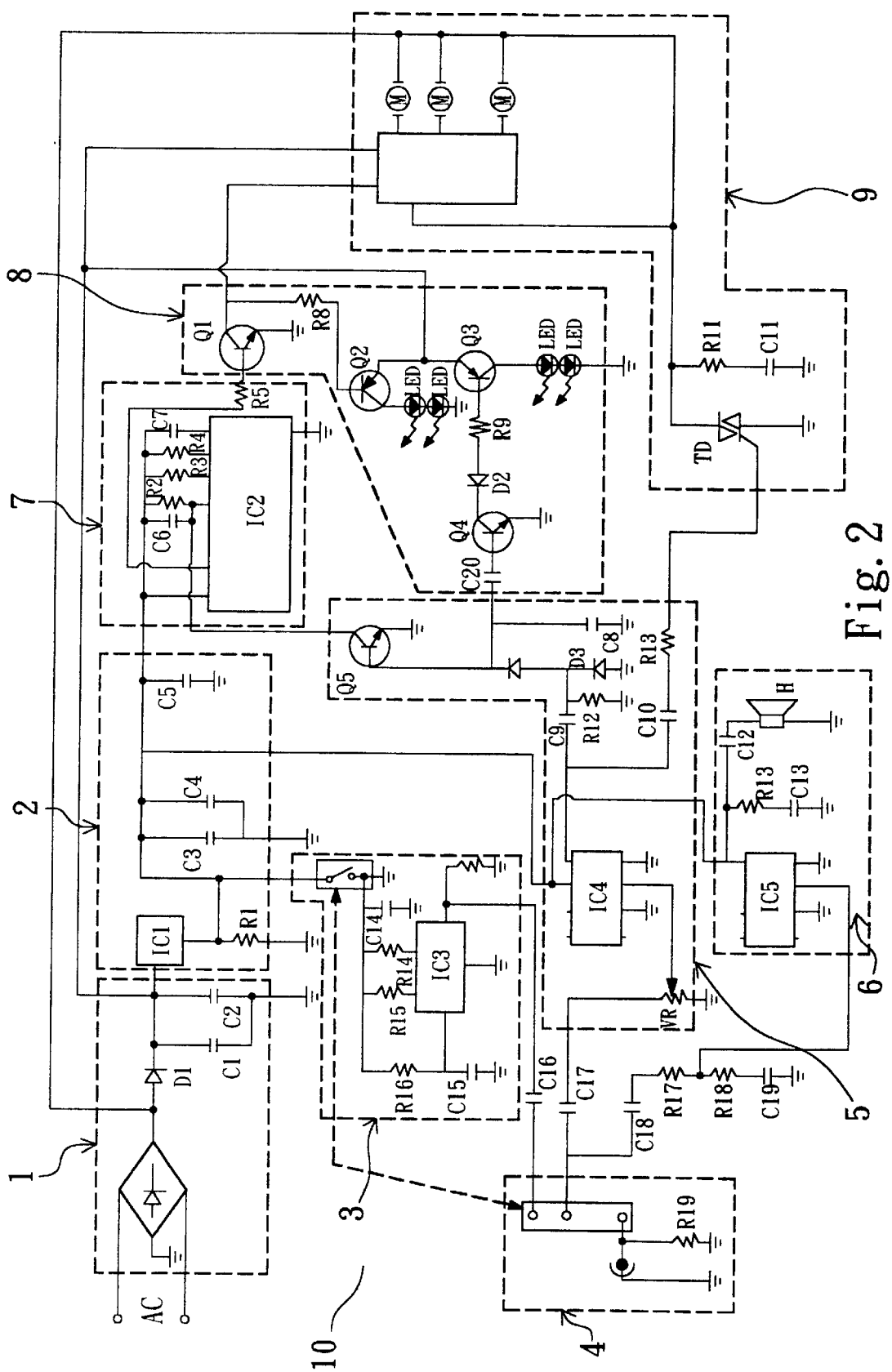
FIG. 2 is a circuit diagram of the control circuit assembly used in the fountain display apparatus shown in FIG. 1.
Figure 3:
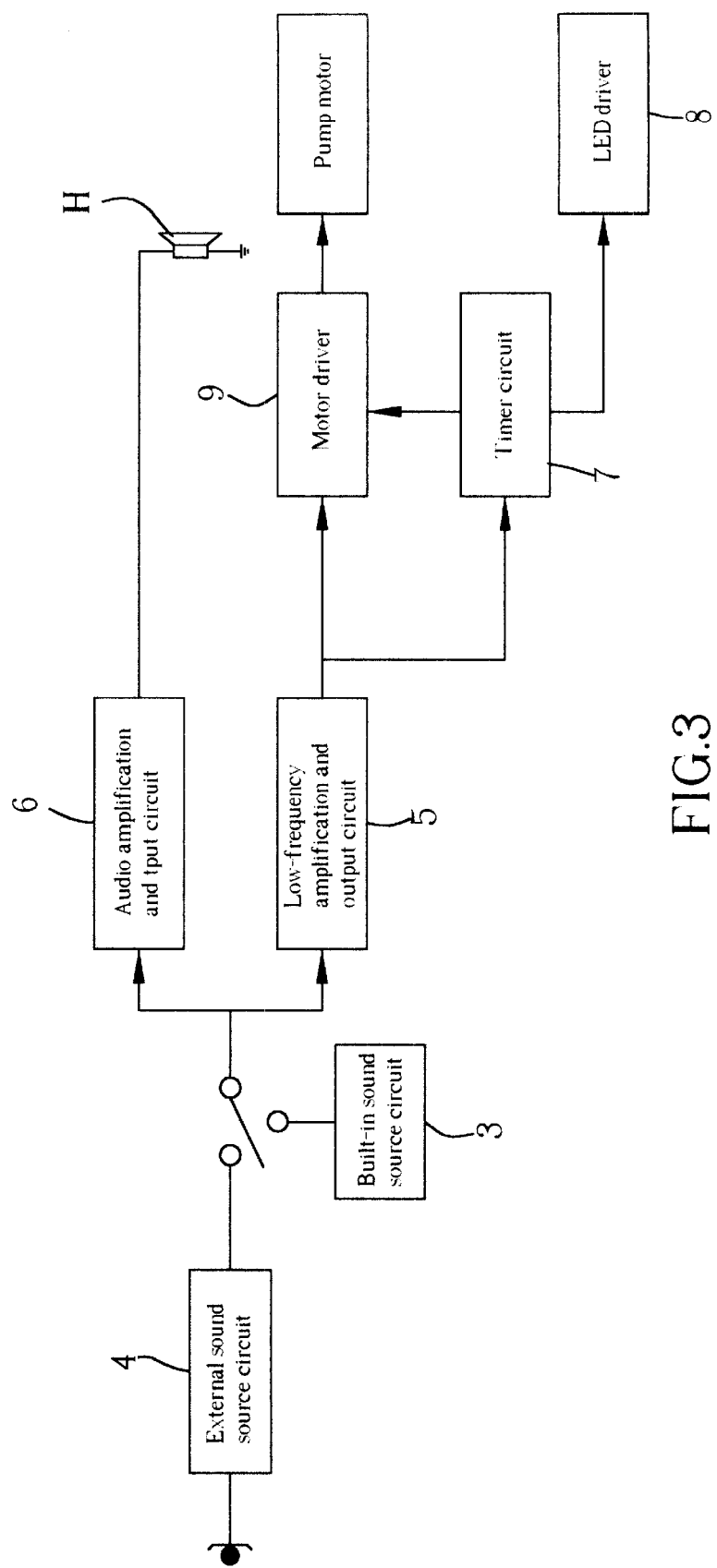
FIG. 3 is a circuit block diagram of the present invention.

Referring to FIGS. 1, 2, and 3, a fountain display apparatus is shown comprised of a basin-like body 1, a control circuit assembly 10 installed in the bottom of the basin-like body 1 and controlled to force water upwards through top jet nozzles of the basin-like body 1, forming artificial springs. The control circuit assembly 10 comprises a power circuit formed of a rectifier filter circuit 1 and a voltage stabilizing circuit 2 and adapted for providing stable DC for working. The control circuit assembly 10 further comprises a built-in sound source circuit 3, an external sound source circuit 4, a low-frequency amplification and output circuit 5, an audio amplification and output circuit 6, a timer circuit 7, a LED driver 8, and a motor driver 9.

The built-in sound source circuit 3 and the external sound source circuit 4 are so arranged that the built-in sound source circuit 3 is off when the external sound source circuit 4 is on. The built-in sound source circuit 3 comprises a crystal IC1 having stored therein pieces of music. The external sound source 4 is connectable to an external audio apparatus for input of music. The low-frequency amplification and output circuit 5 comprises a crystal IC4, a variable resistor VR for volume control, and a transistor Q5. The crystal IC4 is adapted to pick up and amplify low frequency signal from sound source, and to output amplified low frequency signal to the timer circuit 7 and the motor driver 9 when the transistor Q5 triggered, enabling the timer circuit 7 and the motor driver 9 to control the operation of the pump motors M accordingly. The audio amplification and output circuit 6 comprises a crystal IC5 and a speaker H, and is adapted for amplifying sound signal from sound source and outputting amplified sound signal. The timer circuit 7 comprises a crystal IC2 adapted for receiving signal from the low-frequency amplification and output circuit 5 and driving the LED driver 8 and the motor driver 9 upon receipt of signal from the low-frequency amplification and output circuit 5. The timer circuit 7 has set therein a time control program for controlling the LED driver 8 to turn on LEDs (light emitting diodes) and the motor driver 9 to drive motor pumps M subject to a predetermined setting. The LED driver 8 comprises four transistors Q1~Q4 and a plurality of LEDs respectively connected to the transistors Q1~Q4. When the LED driver 8 received a control signal from the timer circuit 7, the transistors Q1~Q4 are controlled to turn on/off the LEDs. The motor driver 9 comprises a triggering diode TD, and a plurality of motor pumps M connected in parallel to the triggering diode TD. When the motor driver 9 received a control signal from the timer circuit 7, the triggering diode TD triggers the motor driver 9 to control the operation of the motor pumps M.

The operation of the present invention is outlined hereinafter with reference to FIG. 3. At first, select the desired music from the built-in sound source circuit 3 or the external sound source circuit 4 (for example, the tape recorder). The selected sound source is processed through the low-frequency amplification and output circuit 5 and the audio amplification and output circuit 6, thereby causing the crystal IC5 to amplify sound signal and to output amplified sound signal through the speaker H, the crystal IC4 to pick up and amplify low frequency signal from selected sound source and to output amplified low frequency signal to the timer circuit 7, the motor driver 9, and the LED driver 8. Upon receipt of amplified low frequency signal from the low-frequency amplification and output circuit 5, the motor driver 9 drives the motor pumps M to pump out water, producing artificial springs, and the transistors Q1~Q4 of the LED driver 8 are electrically connected to turn on the LEDs. At the same time, the timer circuit 7 controls the operation of the LEDs (the transistors Q1~Q4) and the operation of the motor pumps M subject to the pre-set time control program.

Therefore, a music is reproduced, and at the same time a water dancing effect and a lighting effect are produced, matching the reproduction of the music.

While only one embodiment of the present invention has been shown and described, it will be understood that various modifications and changes could be made thereunto without departing from the spirit and scope of the invention disclosed.

What the invention claimed is:

1. A control circuit assembly used in a fountain display apparatus, comprising:

a built-in sound source circuit and an external sound source circuit adapted for providing a sound source, said built-in sound source circuit and said external sound source circuit being so arranged that said built-in sound source circuit is off when said external sound source circuit is on, said built-in sound source circuit comprising an IC having stored therein pieces of music, said external sound source being connectable to an external audio apparatus for input of music;

a low-frequency amplification and output circuit, said low-frequency amplification and output circuit comprising an IC adapted for picking up and amplifying low frequency signal from the sound source provided by said built-in sound source circuit and an external sound source circuit, a variable resistor for volume control, and a transistor for controlling output of amplified low frequency signal;

an audio amplification and output circuit, said audio amplification and output circuit comprising an IC adapted for amplifying sound signal provided by said built-in sound source circuit and an external sound source circuit, and speaker means for output of amplified sound signal;

a LED driver, said LED driver comprising a plurality of LEDs (light emitting diodes), and a plurality of transistors and adapted for controlling said LEDs respectively;

a motor driver, said motor driver comprising a triggering diode, and a plurality of motor pumps connected in parallel to said triggering diode and controlled by said triggering diode to pump waters in producing artificial springs;

a timer circuit, said timer circuit comprising an IC adapted for receiving output signal from the low-frequency amplification and output circuit and controlling the transistors of said LED driver and the triggering diode of said motor driver to turn on/off said LEDs and said motor pumps subject to output signal from said low-frequency amplification and output circuit, a time control program set therein for controlling said LED driver and said motor driver to turn on/off said LEDs and said motor pumps subject to a predetermined setting.

* * * * *